United States Patent
Kao et al.

(10) Patent No.: US 8,438,384 B2
(45) Date of Patent: May 7, 2013

(54) SYSTEM AND METHOD FOR PERFORMING MUTUAL AUTHENTICATION

(75) Inventors: Ming-Chuan Kao, New Taipei (TW); Qing-Hua Li, Shenzhen (CN); Shih-Hao Liu, New Taipei (TW); Li-Na Dai, Shenzhen (CN); Kai-Ying Hu, Shenzhen (CN); Zhong-Wei Li, Shenzhen (CN)

(73) Assignees: GDS Software (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 321 days.

(21) Appl. No.: 13/012,815

(22) Filed: Jan. 25, 2011

(65) Prior Publication Data

US 2012/0096259 A1    Apr. 19, 2012

(51) Int. Cl.
*H04L 29/06* (2006.01)
(52) U.S. Cl.
USPC .......................................................... 713/155
(58) Field of Classification Search .................. 713/155, 713/185, 193
See application file for complete search history.

(56) References Cited

U.S. PATENT DOCUMENTS

| 5,369,758 A * | 11/1994 | Larson et al. ................ 714/6.32 |
| 2005/0005149 A1* | 1/2005 | Hirota et al. .................. 713/193 |
| 2008/0235513 A1* | 9/2008 | Foster et al. .................. 713/185 |

OTHER PUBLICATIONS

William Stallings (Cryptography and Network Security; Third Edition; ISBN 81-7808-902-5; Pearson Education Inc.; 2003; pp. 384-391.*

* cited by examiner

*Primary Examiner* — Hadi Armouche
*Assistant Examiner* — Sanchit Sarker
(74) *Attorney, Agent, or Firm* — Altis Law Group, Inc.

(57) ABSTRACT

A system and method for performing mutual authentication verifies a username and a password of a handheld device by a server, and verifies an identity of the server by the handheld device if the handheld device passes the username and password verification. The system and method further verifies an identity of the handheld device by the server if the identity of the server is valid, and gives an access authority to the handheld device if the identity of the handheld device is valid.

16 Claims, 4 Drawing Sheets

SYSTEM AND METHOD FOR PERFORMING MUTUAL AUTHENTICATION

BACKGROUND

1. Technical Field

Embodiments of the present disclosure relate to security authentication technology, and particularly to a system and method for performing mutual authentication between a handheld device and a server.

2. Description of Related Art

Authentication between a handheld device and a server is performed by verifying a username and a password of the handheld device. However, under the username and password authentication mechanism, security authentication of the server is not performed. Therefore, an efficient system and method for performing mutual authentication between a handheld device and a server is desired.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Figure 1:
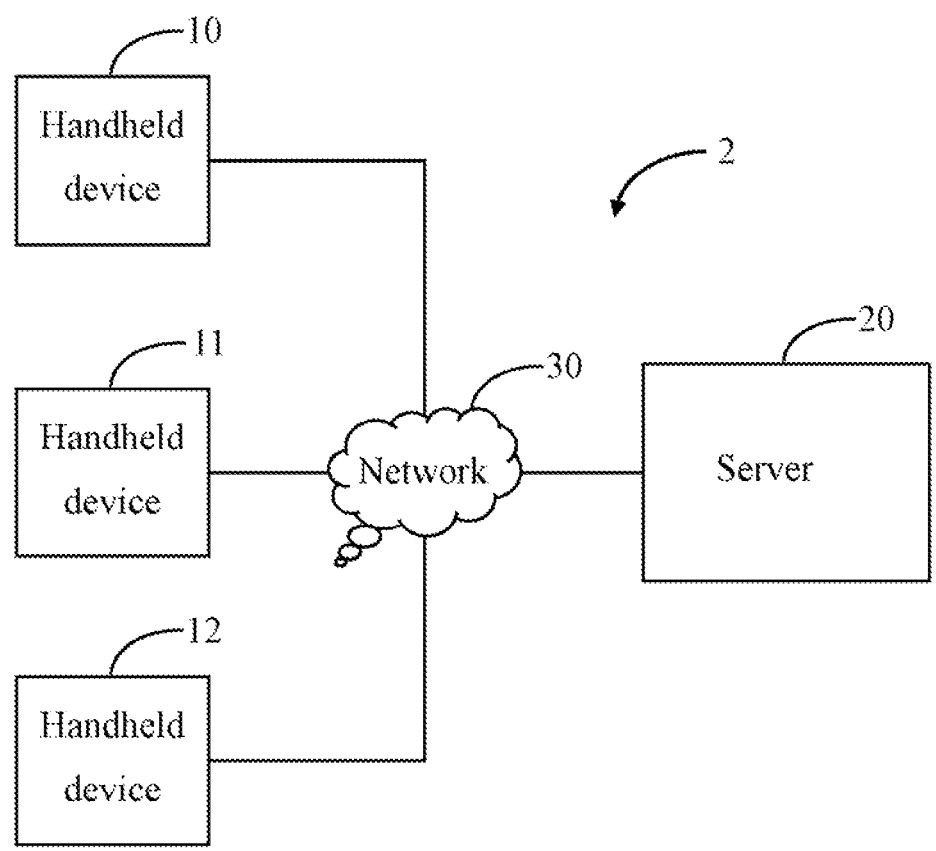
FIG. 1 is a block diagram of one embodiment of a system for performing mutual authentication between a plurality of handheld devices and a server.

FIG. 1 is a block diagram of one embodiment of a system 2 for performing mutual authentication (e.g., two-way authentication) between a plurality of handheld devices and a server. In one embodiment, the system 2 may be used to verify identities of the handheld devices and the server simultaneously. A detailed description will be given in the following paragraphs.

In one embodiment, the system 2 may include a plurality of handheld devices (e.g., 10, 11, and 12) and a server 20. Each of the handheld devices is electronically connected to the server 20 through a network 30. Depending on the embodiment, the network 30 may be an intranet, the Internet or other suitable communication networks. In one embodiment, the server 20 may be a cloud server with a cloud computing function.

Figure 2:
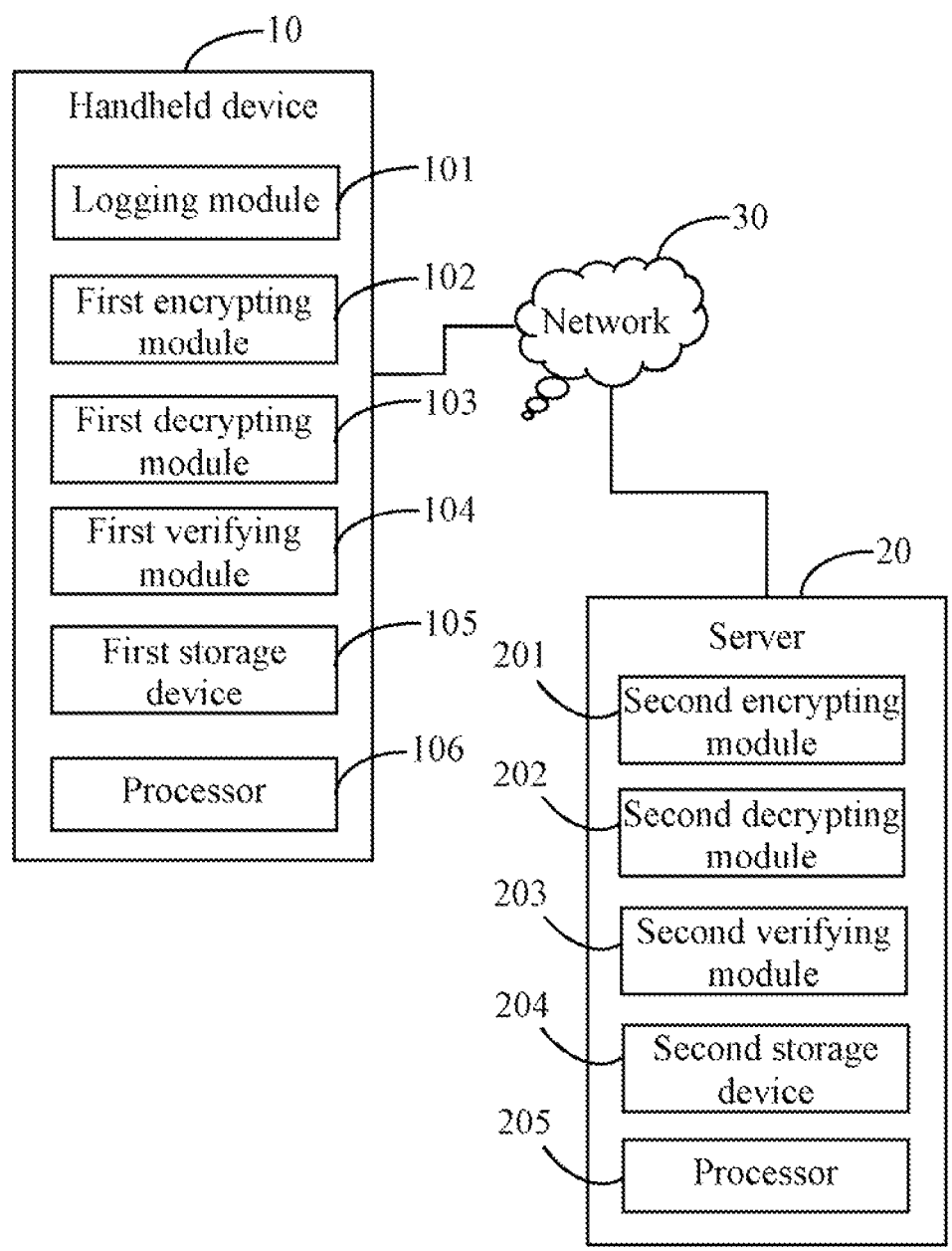
FIG. 2 is a block diagram of one embodiment of a handheld device and a server in FIG. 1.

FIG. 2 is a block diagram of one embodiment of a handheld device 10 and the server 20 in FIG. 1. In one embodiment, the handheld device 10 may include one or more modules, for example, a logging module 101, a first encrypting module 102, a first decrypting module 103, and a first verifying module 104. The one or more modules 101-104 may comprise computerized code in the form of one or more programs that are stored in a first storage device 105 (or memory) of the handheld device 10. The computerized code includes instructions that are executed by the at least one processor 106 to provide functions for the one or more modules 101-104.

In one embodiment, the server 20 may include one or more modules, for example, a second encrypting module 201, a second decrypting module 202, and a second verifying module 203. The one or more modules 201-203 may comprise computerized code in the form of one or more programs that are stored in a second storage device 204 (or memory) of the server 20. The computerized code includes instructions that are executed by the at least one processor 205 to provide functions for the one or more modules 201-203. Detailed descriptions of the function of each of the plurality of modules 101-104 and 201-203 are given in FIG. 3 and FIG. 4.

Figure 3:
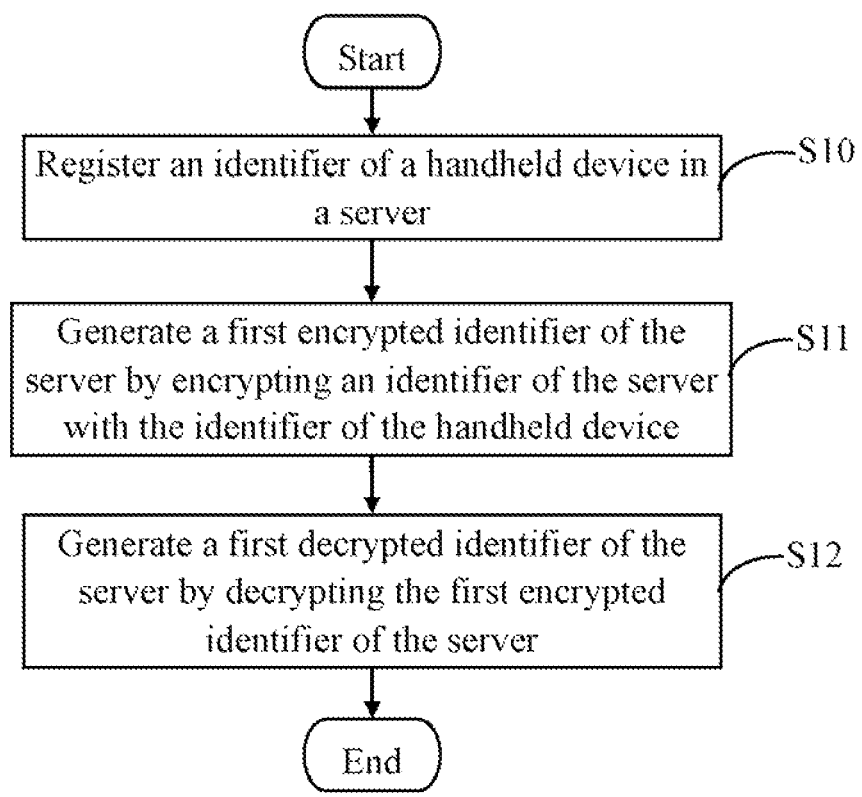
FIG. 3 is a flowchart of one embodiment of a method for registering an identifier of a handheld device in a server.

FIG. 3 is a flowchart of one embodiment of a method for registering an identifier of the handheld device 10 in the server 20. Depending on the embodiment, additional blocks may be added, others removed, and the ordering of the blocks may be changed.

In block S10, the handheld device 10 registers an identifier of the handheld device 10 with a username and a password in the server 20. In one embodiment, the identifier of the handheld device 10 may be a unique device identifier (UDID).

In block S11, the server 20 stores the username, the password, and the identifier of the handheld device 10 in the second storage device 204. The second encrypting module 201 generates a first encrypted identifier "SID1'" of the server 20 by encrypting an identifier "SID" of the server 20 with the identifier "UDID" of the handheld device 10, and sends the first encrypted identifier "SID1'" of the server 20 to the handheld device 10. In one embodiment, the identifier of the server 20 may be a security identifier (SID). An example of an encryption formula is "SID1'=encrypt (SID, UDID)." In one embodiment, the encryption function may be a triple data encryption standard (DES) method.

In block S12, the first decrypting module 103 generates a first decrypted identifier "SID1''" of the server 20 by decrypting the first encrypted identifier "SID'" of the server 20 with the identifier "UDID" of the handheld device 10, and stores the first decrypted identifier "SID1''" of the server 20 in the first storage device 105. An example of an encryption formula is "SID1''=decrypt (SID1', UDID)."

Figure 4:
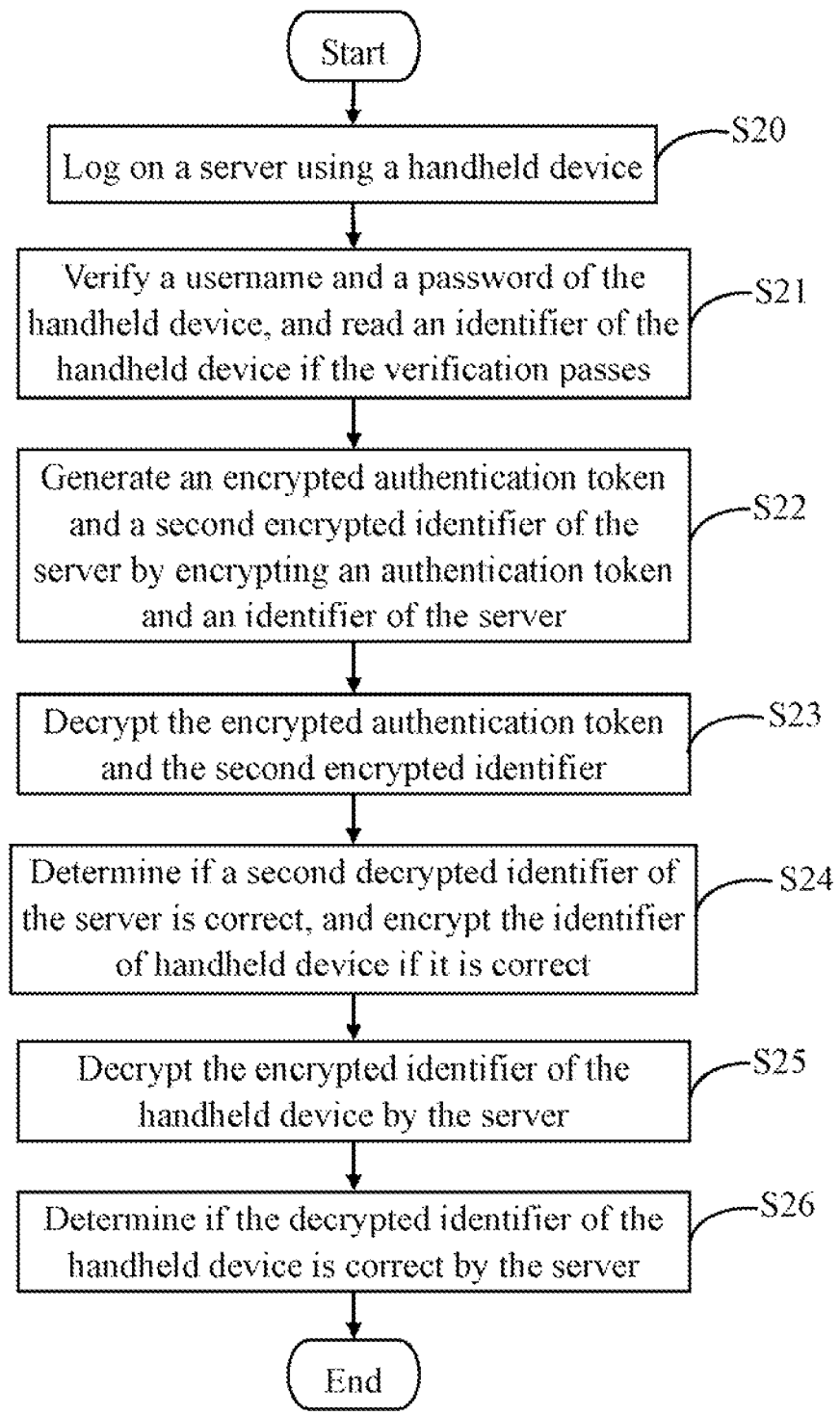
FIG. 4 is a flowchart of one embodiment of a method for performing mutual authentication between a handheld device and a server.

FIG. 4 is a flowchart of one embodiment of a method for performing mutual authentication between the handheld device 10 and the server 20. Depending on the embodiment, additional blocks may be added, others removed, and the ordering of the blocks may be changed.

In block S20, the handheld device 10 logs on the server 20 using the logging module 101.

In block S21, the server 20 verifies the username and the password of the handheld device 10. If the username and the password of the handheld device 10 are correct, the second encrypting module 201 reads the identifier of the handheld device 10 "UDID" from the second storage device 204. If the username or the password of the handheld device 10 is incorrect, the server 20 rejects the access request of the handheld device 10.

In block S22, the second encrypting module 201 generates an encrypted authentication token "Token'" of the server 20 and a second encrypted identifier "SID2'" of the server 20 by encrypting an authentication token "Token" of the server 20 and the identifier "SID" of the server 20, and sends the encrypted authentication token "Token'" of the server 20 and the second encrypted identifier "SID2'" of the server 20 to the handheld device 10. A detailed description is as follows.

First, the second encrypting module 201 generates an authentication token "Token" of the server 20 using random numbers, and generates an encrypted authentication token "Token'" of the server 20 by encrypting the authentication token "Token" of the server 20 with the identifier "UDID" of the handheld device 10. An example of an encryption formula is "Token'=encrypt (Token, UDID)."

Second, the second encrypting module 201 generates a second encrypted identifier "SID2'" of the server 20 by encrypting the identifier "SID" of the server 20 with the encrypted authentication token "Token'" of the server 20. An example of an encryption formula is "SID2'=encrypt (SID, Token')."

In block S23, the first decrypting module 103 generates a decrypted authentication token "Token''" of the server 20 and a second decrypted identifier "SID2''" of the server 20 by decrypting the encrypted authentication token "Token'" of the server 20 and the second encrypted identifier "SID2'" of the server. A detailed description is as follows.

The first decrypting module 103 generates a decrypted authentication token "Token''" of the server 20 by decrypting the encrypted authentication token "Token'" of the server 20 with the identifier "UDID" of the handheld device 10. An example of a decryption formula is "Token''=decrypt (Token', UDID)."

The first decrypting module 103 generate a second decrypted identifier "SID2''" of the server 20 by decrypting the second encrypted identifier "SID2'" of the server 20 with the decrypted authentication token "Token''" of the server 20. An example of a decryption formula is "SID2''=decrypt (SID2', Token'')."

In block S24, the first verifying module 104 determines if the second decrypted identifier "SID2''" of the server 20 is correct according to the first decrypted identifier "SID1''" of the server 20 stored in the first storage device 105. If the second decrypted identifier "SID2''" of the server 20 matches the first decrypted identifier "SID1''" of the server 20 stored in the first storage device 105 (e.g., SID2''==SID1''), the first verifying module 104 determines that the second decrypted identifier "SID2''" of the server 20 is correct. If the second decrypted identifier "SID2''" of the server 20 does not match the first decrypted identifier "SID1''" of the server 20 stored in the first storage device 105 (e.g., SID2" !=SID1''), the first verifying module 104 determines that the second decrypted identifier "SID2''" of the server 20 is incorrect, the handheld device 10 stops the communication with the server 20.

If the second decrypted identifier "SID2''" of the server 20 is correct, the first encrypting module 102 generates an encrypted identifier "UDID'" of the handheld device 10 by encrypting the identifier "UDID" of the handheld device 10 with the decrypted authentication token "Token''" of the server 20, and sends the encrypted identifier "UDID'" of the handheld device 10 to the server 20. An example of an encryption formula is "UDID'=encrypt (UDID, Token'')."

In block S25, the second decrypting module 202 generates a decrypted identifier "UDID''" of the handheld device 10 by decrypting the encrypted identifier "UDID'" of the handheld device 10 with the authentication token "Token" of the server 20. An example of an decryption formula is "UDID''=decrypt (UDID', Token)."

In block S26, the second verifying module 203 determines if the decrypted identifier "UDID''" of the handheld device 10 is correct according to the identifier "UDID" of the handheld device 10 stored in the second storage device 204. If the decrypted identifier "UDID''" of the handheld device 10 matches the identifier "UDID" of the handheld device 10 stored in the second storage device 204 (e.g., UDID''==UDID), the second verifying module 203 determines that the decrypted identifier "UDID''" of the handheld device 10 is correct. If the decrypted identifier "UDID''" of the handheld device 10 does not match the identifier "UDID" of the handheld device 10 stored in the second storage device 204 (e.g., UDID" !=UDID), the second verifying module 203 determines that the decrypted identifier "UDID''" of the handheld device 10 is incorrect, the server 20 rejects the access request of the handheld device 10.

If the decrypted identifier "UDID''" of the handheld device 10 is correct, the server 20 allocates an access authority to the handheld device 10. The handheld device 10 receives the access authority, and begins to communicate with the server 20 through the network 30.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for performing mutual authentication between a handheld device and a server, the method comprising:

verifying a username and a password of the handheld device by the server, and reading an identifier of the handheld device from a second storage device of the server upon the condition that the username and the password of the handheld device are correct;

generating an encrypted authentication token and a second encrypted identifier of the server by encrypting an authentication token and an identifier of the server, and sending the encrypted authentication token and the second encrypted identifier of the server to the handheld device;

receiving an encrypted identifier of the handheld device from the handheld device upon the condition that the handheld device determines that the second encrypted identifier of the server is correct;

generating a decrypted identifier of the handheld device by decrypting the encrypted identifier of the handheld device with the authentication token of the server; and determining if the decrypted identifier of the handheld device is correct according to the identifier of the handheld device stored in the second storage device, and allocating an access authority to the handheld device upon the condition that the decrypted identifier of the handheld device is correct.

2. The method according to claim 1, wherein the step of encrypting an authentication token and an identifier of the server comprises:

generating an authentication token of the server using random numbers, and generating an encrypted authentication token of the server by encrypting the authentication token of the server with the identifier of the handheld device; and generating a second encrypted identifier of the server by encrypting the identifier of the server with the encrypted authentication token of the server.

3. The method according to claim 1, wherein the step of determining if the decrypted identifier of the handheld device is correct comprises:

determining that the decrypted identifier of the handheld device is correct upon the condition that the decrypted identifier of the handheld device matches the identifier of the handheld device stored in the second storage device; or determining that the decrypted identifier of the handheld device is incorrect upon the condition that the decrypted identifier of the handheld device does not match the identifier of the handheld device stored in the second storage device.

4. The method according to claim 1, further comprising:

receiving a username, a password, and an identifier of the handheld device by the server, and storing the username, the password, and the identifier of the handheld device in the second storage device of the server; and generating a first encrypted identifier of the server by encrypting an identifier of the server with the identifier of the handheld device, and sending the first encrypted identifier of the server to the handheld device.

5. A method for performing mutual authentication between a handheld device and a server, the method comprising:

receiving an encrypted authentication token and a second encrypted identifier of the server by the handheld device;

generating a decrypted authentication token and a second decrypted identifier of the server by decrypting the encrypted authentication token and the second encrypted identifier of the server;

determining if the second decrypted identifier of the server is correct according to a first decrypted identifier of the server stored in a first storage device of the handheld device;

generating an encrypted identifier of the handheld device by encrypting the identifier of the handheld device with the decrypted authentication token of the server upon the condition that the second decrypted identifier of the server is correct, and sending the encrypted identifier of the handheld device to the server; and receiving an access authority sent from the server upon the condition that the encrypted identifier of the handheld device is correct.

6. The method according to claim 5, wherein the step of decrypting the encrypted authentication token and the second encrypted identifier of the server comprises:

generating a decrypted authentication token of the server by decrypting the encrypted authentication token of the server with the identifier of the handheld device; and generating a second decrypted identifier of the server by decrypting the second encrypted identifier of the server with the decrypted authentication token of the server.

7. The method according to claim 5, wherein the step of determining if the second decrypted identifier of the server is correct comprises:

determining that the second decrypted identifier of the server is correct upon the condition that the second decrypted identifier of the server matches the first decrypted identifier of the server stored in the first storage device; or determining that the second decrypted identifier of the server is incorrect upon the condition that the second decrypted identifier of the server does not match the first decrypted identifier of the server stored in the first storage device.

8. The method according to claim 5, further comprising:

sending a username, a password, and an identifier of the handheld device to the server; and receiving a first encrypted identifier of the server by the handheld device, generating a first decrypted identifier of the server by decrypting the first encrypted identifier of the server with the identifier of the handheld device, and storing the first decrypted identifier of the server in the first storage device of the handheld device.

9. A server for performing mutual authentication with a handheld device, the server comprising:

a second storage device;

at least one processor; and one or more modules that are stored in the second storage device and are executed by the at least one processor, the one or more modules comprising instructions:

to verify a username and a password of the handheld device by the server, and read an identifier of the handheld device from the second storage device of the server upon the condition that the username and the password of the handheld device are correct;

to generate an encrypted authentication token and a second encrypted identifier of the server by encrypting an authentication token and an identifier of the server, and send the encrypted authentication token and the second encrypted identifier of the server to the handheld device;

to receive an encrypted identifier of the handheld device from the handheld device upon the condition that the handheld device determines that the second encrypted identifier of the server is correct;

to generate a decrypted identifier of the handheld device by decrypting the encrypted identifier of the handheld device with the authentication token of the server; and to determine if the decrypted identifier of the handheld device is correct according to the identifier of the handheld device stored in the second storage device, and allocate an access authority to the handheld device upon the condition that the decrypted identifier of the handheld device is correct.

10. The server according to claim 9, wherein the instruction to encrypt an authentication token and an identifier of the server comprises:

generating an authentication token of the server using random numbers, and generating an encrypted authentication token of the server by encrypting the authentication token of the server with the identifier of the handheld device; and generating a second encrypted identifier of the server by encrypting the identifier of the server with the encrypted authentication token of the server.

11. The server according to claim 9, wherein the instruction to determine if the decrypted identifier of the handheld device is correct comprises:

determining that the decrypted identifier of the handheld device is correct upon the condition that the decrypted identifier of the handheld device matches the identifier of the handheld device stored in the second storage device; or determining that the decrypted identifier of the handheld device is incorrect upon the condition that the decrypted identifier of the handheld device does not match the identifier of the handheld device stored in the second storage device.

12. The server according to claim 9, wherein the one or more modules further comprise instructions:

to receive a username, a password, and an identifier of the handheld device by the server, and storing the username, the password, and the identifier of the handheld device in the second storage device of the server; and to generate a first encrypted identifier of the server by encrypting an identifier of the server with the identifier of the handheld device, and sending the first encrypted identifier of the server to the handheld device.

13. A handheld device for performing mutual authentication with a server, the handheld device comprising:
- a first storage device;
- at least one processor; and
- one or more modules that are stored in the first storage device and are executed by the at least one processor, the one or more modules comprising instructions:
- to receive an encrypted authentication token and a second encrypted identifier of the server by the handheld device;
- to generate a decrypted authentication token and a second decrypted identifier of the server by decrypting the encrypted authentication token and the second encrypted identifier of the server;
- to determine if the second decrypted identifier of the server is correct according to a first decrypted identifier of the server stored in the first storage device of the handheld device;
- to generate an encrypted identifier of the handheld device by encrypting the identifier of the handheld device with the decrypted authentication token of the server upon the condition that the second decrypted identifier of the server is correct, and send the encrypted identifier of the handheld device to the server; and
- to receive an access authority sent from the server upon the condition that the encrypted identifier of the handheld device is correct.

14. The handheld device according to claim 13, wherein the instruction to decrypt the encrypted authentication token and the second encrypted identifier of the server comprises:
- generating a decrypted authentication token of the server by decrypting the encrypted authentication token of the server with the identifier of the handheld device; and
- generating a second decrypted identifier of the server by decrypting the second encrypted identifier of the server with the decrypted authentication token of the server.

15. The handheld device according to claim 13, wherein the instruction to determine if the second decrypted identifier of the server is correct comprises:
- determining that the second decrypted identifier of the server is correct upon the condition that the second decrypted identifier of the server matches the first decrypted identifier of the server stored in the first storage device; or
- determining that the second decrypted identifier of the server is incorrect upon the condition that the second decrypted identifier of the server does not match the first decrypted identifier of the server stored in the first storage device.

16. The handheld device according to claim 13, wherein the one or more modules further comprise instructions:
- to send a username, a password, and an identifier of the handheld device to the server; and
- to receive a first encrypted identifier of the server by the handheld device, generating a first decrypted identifier of the server by decrypting the first encrypted identifier of the server with the identifier of the handheld device, and storing the first decrypted identifier of the server in the first storage device of the handheld device.

* * * * *

UNITED STATES PATENT AND TRADEMARK OFFICE
CERTIFICATE OF CORRECTION

PATENT NO. : 8,438,384 B2
APPLICATION NO. : 13/012815
DATED : May 7, 2013
INVENTOR(S) : Ming-Chuan Kao et al.

Page 1 of 1

It is certified that error appears in the above-identified patent and that said Letters Patent is hereby corrected as shown below:

On the title page insert the following:

--(30)    Foreign Application Priority Data

October 19, 2010   (CN) ........................2010 1 0510419--

Signed and Sealed this
Twenty-sixth Day of November, 2013

Margaret A. Focarino
*Commissioner for Patents of the United States Patent and Trademark Office*